United States Patent
Sim-Tang et al.

(10) Patent No.: US 8,544,023 B2
(45) Date of Patent: Sep. 24, 2013

(54) MANAGEMENT INTERFACE FOR A SYSTEM THAT PROVIDES AUTOMATED, REAL-TIME, CONTINUOUS DATA PROTECTION

(75) Inventors: Siew Yong Sim-Tang, Saratoga, CA (US); Daniel J. Fraisl, Saratoga, CA (US); Anthony N. Hoeber, Saratoga, CA (US)

(73) Assignee: Dell Software Inc., Aliso Viejo, CA (US)

( * ) Notice: Subject to any disclaimer, the term of this patent is extended or adjusted under 35 U.S.C. 154(b) by 200 days.

(21) Appl. No.: 12/901,888

(22) Filed: Oct. 11, 2010

(65) Prior Publication Data

US 2011/0252432 A1   Oct. 13, 2011

Related U.S. Application Data

(63) Continuation of application No. 11/264,110, filed on Nov. 1, 2005, now Pat. No. 7,904,913.

(60) Provisional application No. 60/624,358, filed on Nov. 2, 2004.

(51) Int. Cl.
*G06F 9/46*   (2006.01)

(52) U.S. Cl.
USPC ............................. 719/311; 719/318; 709/224

(58) Field of Classification Search
USPC .................................. 719/311, 318; 709/224
See application file for complete search history.

(56) References Cited

U.S. PATENT DOCUMENTS

| | | | |
|---|---|---|---|
| 3,555,184 A | 1/1971 | Townley | |
| 3,555,195 A | 1/1971 | Rester et al. | |
| 3,555,204 A | 1/1971 | Braun | |
| 3,555,251 A | 1/1971 | Shavit | |
| 3,648,250 A | 3/1972 | Low et al. | |
| 4,162,536 A | 7/1979 | Morley | |
| 4,402,045 A | 8/1983 | Krol | |
| 4,415,792 A | 11/1983 | Jordan | |
| 4,450,556 A | 5/1984 | Boleda et al. | |
| 4,451,108 A | 5/1984 | Skidmore | |

(Continued)

FOREIGN PATENT DOCUMENTS

| | | |
|---|---|---|
| WO | WO-98/19262 A1 | 5/1998 |
| WO | WO-02/25443 A1 | 3/2002 |
| WO | WO-03060774 A1 | 7/2003 |

OTHER PUBLICATIONS

U.S. Appl. No. 13/242,916, filed Sep. 23, 2011, Sim-Tang, Siew Yong.
U.S. Appl. No. 13/489,751, filed Jun. 6, 2012, Sim-Tang, Siew Yong.
U.S. Appl. No. 13/752,020, filed Jan. 28, 2013, Siew Yong Sim-Tang.
U.S. Appl. No. 13/721,588, filed Dec. 20, 2012, Siew Yong Sim-Tang.
Reichenberger, "Delta Storage for Arbitrary Non-Text Files", SCM '91 Proceedings of the 3rd international workshop on Software configuration management, pp. 144-152, ACM 1991.

(Continued)

*Primary Examiner* — Van Nguyen
(74) *Attorney, Agent, or Firm* — Winstead PC

(57) ABSTRACT

A data management system that protects data into a continuous object store includes a management interface having a time control. The time control allows an administrator to specify a "past" time, such as a single point or range. When the time control is set to a single point, a hierarchical display of data appears on a display exactly as the data existed in the system at that moment in the past. The time control enables the management interface to operate within a history mode in which the display provides a visual representation of a "virtual" point in time in the past during which the data management system has been operative to provide the data protection service.

9 Claims, 14 Drawing Sheets

TO FIG. 8B

(56) References Cited

U.S. PATENT DOCUMENTS

| | | |
|---|---|---|
| 4,455,483 A | 6/1984 | Schonhuber |
| 4,502,082 A | 2/1985 | Ragle et al. |
| 4,512,020 A | 4/1985 | Krol et al. |
| 4,796,260 A | 1/1989 | Schilling et al. |
| 4,882,737 A | 11/1989 | Dzung |
| 4,916,450 A | 4/1990 | Davis |
| 4,972,474 A | 11/1990 | Sabin |
| 5,005,197 A | 4/1991 | Parsons et al. |
| 5,148,479 A | 9/1992 | Bird et al. |
| 5,177,796 A | 1/1993 | Feig et al. |
| 5,224,212 A | 6/1993 | Rosenthal et al. |
| 5,274,508 A | 12/1993 | Tan et al. |
| 5,280,584 A | 1/1994 | Caesar et al. |
| 5,287,504 A | 2/1994 | Carpenter et al. |
| 5,303,393 A | 4/1994 | Noreen et al. |
| 5,305,326 A | 4/1994 | Solomon et al. |
| 5,311,197 A | 5/1994 | Sorden et al. |
| 5,319,395 A | 6/1994 | Larky et al. |
| 5,321,699 A | 6/1994 | Endoh et al. |
| 5,363,371 A | 11/1994 | Roy et al. |
| 5,365,516 A | 11/1994 | Jandrell |
| 5,373,372 A | 12/1994 | Loewen |
| 5,377,102 A | 12/1994 | Nishiishigaki |
| 5,382,508 A | 1/1995 | Ikenoue |
| 5,386,422 A | 1/1995 | Endoh et al. |
| 5,387,994 A | 2/1995 | McCormack et al. |
| 5,388,074 A | 2/1995 | Buckenmaier |
| 5,392,209 A | 2/1995 | Eason et al. |
| 5,396,600 A | 3/1995 | Thompson et al. |
| 5,416,831 A | 5/1995 | Chewning, III et al. |
| 5,424,778 A | 6/1995 | Sugiyama et al. |
| 5,430,830 A | 7/1995 | Frank et al. |
| 5,440,686 A | 8/1995 | Dahman et al. |
| 5,469,444 A | 11/1995 | Endoh et al. |
| 5,477,492 A | 12/1995 | Ohsaki et al. |
| 5,479,654 A | 12/1995 | Squibb |
| 5,481,531 A | 1/1996 | Yamamuro |
| 5,499,512 A | 3/1996 | Jurewicz et al. |
| 5,502,491 A | 3/1996 | Sugiyama et al. |
| 5,506,965 A | 4/1996 | Naoe |
| 5,507,024 A | 4/1996 | Richards, Jr. |
| 5,511,212 A | 4/1996 | Rockoff |
| 5,526,357 A | 6/1996 | Jandrell |
| 5,537,945 A | 7/1996 | Sugihara et al. |
| 5,560,033 A | 9/1996 | Doherty et al. |
| 5,561,671 A | 10/1996 | Akiyama |
| 5,583,975 A | 12/1996 | Naka et al. |
| 5,602,638 A | 2/1997 | Boulware |
| 5,606,601 A | 2/1997 | Witzman et al. |
| 5,640,159 A | 6/1997 | Furlan et al. |
| 5,644,763 A | 7/1997 | Roy |
| 5,651,129 A | 7/1997 | Yokote et al. |
| 5,657,398 A | 8/1997 | Guilak |
| 5,678,042 A | 10/1997 | Pisello et al. |
| 5,684,536 A | 11/1997 | Sugiyama et al. |
| 5,684,693 A | 11/1997 | Li |
| 5,684,774 A | 11/1997 | Yamamuro |
| 5,724,241 A | 3/1998 | Wood et al. |
| 5,729,743 A | 3/1998 | Squibb |
| 5,737,399 A | 4/1998 | Witzman et al. |
| 5,742,509 A | 4/1998 | Goldberg et al. |
| 5,742,915 A | 4/1998 | Stafford |
| 5,754,772 A | 5/1998 | Leaf |
| 5,764,691 A | 6/1998 | Hennedy et al. |
| 5,768,159 A | 6/1998 | Belkadi et al. |
| 5,778,370 A | 7/1998 | Emerson |
| 5,781,612 A | 7/1998 | Choi et al. |
| 5,784,366 A | 7/1998 | Apelewicz |
| 5,794,252 A | 8/1998 | Bailey et al. |
| 5,805,155 A | 9/1998 | Allibhoy et al. |
| 5,812,130 A | 9/1998 | Van Huben et al. |
| RE35,920 E | 10/1998 | Sorden et al. |
| 5,819,020 A | 10/1998 | Beeler, Jr. |
| 5,822,749 A | 10/1998 | Agarwal |
| 5,826,265 A | 10/1998 | Van Huben et al. |
| 5,831,903 A | 11/1998 | Ohuchi et al. |
| 5,841,717 A | 11/1998 | Yamaguchi |
| 5,841,771 A | 11/1998 | Irwin et al. |
| 5,848,072 A | 12/1998 | Prill et al. |
| 5,854,834 A | 12/1998 | Gottlieb et al. |
| 5,862,136 A | 1/1999 | Irwin |
| 5,864,875 A | 1/1999 | Van Huben et al. |
| 5,877,742 A | 3/1999 | Klink |
| 5,878,408 A | 3/1999 | Van Huben et al. |
| 5,893,119 A | 4/1999 | Squibb |
| 5,894,494 A | 4/1999 | Davidovici |
| 5,909,435 A | 6/1999 | Apelewicz |
| 5,915,251 A | 6/1999 | Burrows |
| 5,917,429 A | 6/1999 | Otis, Jr. et al. |
| 5,918,248 A | 6/1999 | Newell et al. |
| 5,920,867 A | 7/1999 | Van Huben et al. |
| 5,920,873 A | 7/1999 | Van Huben et al. |
| 5,928,327 A | 7/1999 | Wang et al. |
| 5,930,732 A | 7/1999 | Domanik et al. |
| 5,930,762 A | 7/1999 | Masch |
| 5,931,928 A | 8/1999 | Brennan et al. |
| 5,937,168 A | 8/1999 | Anderson et al. |
| 5,940,823 A | 8/1999 | Schreiber et al. |
| 5,950,201 A | 9/1999 | Van Huben et al. |
| 5,953,729 A | 9/1999 | Cabrera et al. |
| 5,958,010 A | 9/1999 | Agarwal et al. |
| 5,966,707 A | 10/1999 | Van Huben et al. |
| 5,974,563 A | 10/1999 | Beeler, Jr. |
| 5,980,096 A | 11/1999 | Thalhammer-Reyero |
| 5,999,562 A | 12/1999 | Hennedy et al. |
| 6,005,846 A | 12/1999 | Best et al. |
| 6,005,860 A | 12/1999 | Anderson et al. |
| 6,031,848 A | 2/2000 | Brennan |
| 6,035,297 A | 3/2000 | Van Huben et al. |
| 6,047,323 A | 4/2000 | Krause |
| 6,065,018 A | 5/2000 | Beier et al. |
| 6,072,185 A | 6/2000 | Arai et al. |
| 6,088,693 A | 7/2000 | Van Huben et al. |
| 6,094,654 A | 7/2000 | Van Huben et al. |
| 6,108,318 A | 8/2000 | Kolev et al. |
| 6,108,410 A | 8/2000 | Reding et al. |
| 6,154,847 A | 11/2000 | Schofield et al. |
| 6,158,019 A | 12/2000 | Squibb |
| 6,163,856 A | 12/2000 | Dion et al. |
| 6,178,121 B1 | 1/2001 | Maruyama |
| 6,181,609 B1 | 1/2001 | Muraoka |
| 6,189,016 B1 | 2/2001 | Cabrera et al. |
| 6,237,122 B1 | 5/2001 | Maki |
| 6,243,348 B1 | 6/2001 | Goodberlet |
| 6,249,824 B1 | 6/2001 | Henrichs |
| 6,366,926 B1 | 4/2002 | Pohlmann et al. |
| 6,366,988 B1 | 4/2002 | Skiba et al. |
| 6,389,427 B1 | 5/2002 | Faulkner |
| 6,393,582 B1 | 5/2002 | Klecka et al. |
| 6,397,242 B1 | 5/2002 | Devine et al. |
| 6,446,136 B1 | 9/2002 | Pohlmann et al. |
| 6,460,055 B1 | 10/2002 | Midgley et al. |
| 6,463,565 B1 | 10/2002 | Kelly et al. |
| 6,487,561 B1 | 11/2002 | Ofek et al. |
| 6,487,581 B1 | 11/2002 | Spence et al. |
| 6,496,944 B1 | 12/2002 | Hsiao et al. |
| 6,502,133 B1 | 12/2002 | Baulier et al. |
| 6,519,612 B1 | 2/2003 | Howard et al. |
| 6,526,418 B1 | 2/2003 | Midgley et al. |
| 6,549,916 B1 | 4/2003 | Sedlar |
| 6,611,867 B1 | 8/2003 | Bowman-Amuah |
| 6,625,623 B1 | 9/2003 | Midgley et al. |
| 6,629,109 B1 | 9/2003 | Koshisaka |
| 6,640,145 B2 | 10/2003 | Hoffberg |
| 6,670,974 B1 | 12/2003 | McKnight et al. |
| RE38,410 E | 1/2004 | Hersch et al. |
| 6,751,753 B2 | 6/2004 | Nguyen et al. |
| 6,769,074 B2 | 7/2004 | Vaitzblit |
| 6,779,003 B1 | 8/2004 | Midgley et al. |
| 6,785,786 B1 | 8/2004 | Gold et al. |
| 6,807,550 B1 | 10/2004 | Li et al. |
| 6,816,872 B1 | 11/2004 | Squibb |
| 6,823,336 B1 | 11/2004 | Srinivasan et al. |
| 6,826,711 B2 | 11/2004 | Moulton et al. |

| | | |
|---|---|---|
| 6,836,756 B1 | 12/2004 | Gruber |
| 6,839,721 B2 | 1/2005 | Schwols |
| 6,839,740 B1 | 1/2005 | Kiselev |
| 6,847,984 B1 | 1/2005 | Midgley et al. |
| 6,907,551 B2 | 6/2005 | Katagiri et al. |
| 6,941,310 B2 | 9/2005 | Ahad et al. |
| 6,968,464 B2 * | 11/2005 | Gardiner et al. ............... 713/300 |
| 6,983,286 B1 | 1/2006 | Sinha et al. |
| 6,993,706 B2 | 1/2006 | Cook |
| 7,003,688 B1 | 2/2006 | Pittelkow et al. |
| 7,028,078 B1 | 4/2006 | Sharma et al. |
| 7,039,663 B1 | 5/2006 | Federwisch et al. |
| 7,054,913 B1 | 5/2006 | Kiselev |
| 7,069,579 B2 | 6/2006 | Delpuch |
| 7,080,081 B2 | 7/2006 | Agarwal et al. |
| 7,092,396 B2 | 8/2006 | Lee et al. |
| 7,096,392 B2 | 8/2006 | Sim-Tang |
| 7,200,233 B1 | 4/2007 | Keller et al. |
| 7,206,805 B1 | 4/2007 | McLaughlin, Jr. |
| 7,207,224 B2 | 4/2007 | Rutt et al. |
| 7,272,613 B2 | 9/2007 | Sim et al. |
| 7,290,056 B1 | 10/2007 | McLaughlin, Jr. |
| 7,325,159 B2 | 1/2008 | Stager et al. |
| 7,363,549 B2 | 4/2008 | Sim-Tang |
| 7,519,870 B1 | 4/2009 | Sim-Tang |
| 7,526,541 B2 * | 4/2009 | Roese et al. ............... 709/223 |
| 7,565,661 B2 | 7/2009 | Sim-Tang |
| 7,680,834 B1 | 3/2010 | Sim-Tang |
| 7,689,602 B1 | 3/2010 | Sim-Tang |
| 7,788,521 B1 | 8/2010 | Sim-Tang |
| 7,904,913 B2 | 3/2011 | Sim-Tang et al. |
| 7,979,441 B2 | 7/2011 | Sim-Tang |
| 8,060,889 B2 | 11/2011 | Sim-Tang |
| 8,094,647 B2 * | 1/2012 | Elliott et al. ............... 370/352 |
| 8,108,429 B2 | 1/2012 | Sim-Tang et al. |
| 8,151,140 B2 | 4/2012 | Sim-Tang |
| 8,195,628 B2 | 6/2012 | Sim-Tang |
| 8,200,706 B1 | 6/2012 | Sim-Tang |
| 8,364,648 B1 | 1/2013 | Sim-Tang |
| 8,365,017 B2 | 1/2013 | Sim-Tang |
| 8,375,248 B2 | 2/2013 | Sim-Tang |
| 2001/0029520 A1 | 10/2001 | Miyazaki et al. |
| 2001/0043522 A1 | 11/2001 | Park |
| 2001/0056362 A1 | 12/2001 | Hanagan et al. |
| 2002/0022982 A1 | 2/2002 | Cooperstone et al. |
| 2002/0064149 A1 * | 5/2002 | Elliott et al. ............... 370/352 |
| 2002/0091722 A1 | 7/2002 | Gupta et al. |
| 2002/0107860 A1 | 8/2002 | Gobeille et al. |
| 2002/0144177 A1 | 10/2002 | Kondo et al. |
| 2002/0147807 A1 | 10/2002 | Raguseo |
| 2002/0172222 A1 | 11/2002 | Ullmann et al. |
| 2002/0178397 A1 | 11/2002 | Ueno et al. |
| 2002/0199152 A1 | 12/2002 | Garney et al. |
| 2003/0004947 A1 | 1/2003 | Coverston |
| 2003/0009552 A1 | 1/2003 | Benfield et al. |
| 2003/0051026 A1 | 3/2003 | Carter et al. |
| 2003/0088372 A1 | 5/2003 | Caulfield |
| 2003/0117916 A1 | 6/2003 | Makela et al. |
| 2003/0200098 A1 | 10/2003 | Geipel et al. |
| 2003/0204515 A1 | 10/2003 | Shadmon et al. |
| 2003/0225825 A1 | 12/2003 | Healey et al. |
| 2004/0010544 A1 | 1/2004 | Slater et al. |
| 2004/0036716 A1 | 2/2004 | Jordahl |
| 2004/0047354 A1 | 3/2004 | Slater et al. |
| 2004/0080504 A1 | 4/2004 | Salesky et al. |
| 2004/0098458 A1 | 5/2004 | Husain et al. |
| 2004/0098717 A1 | 5/2004 | Husain et al. |
| 2004/0098728 A1 | 5/2004 | Husain et al. |
| 2004/0098729 A1 | 5/2004 | Husain et al. |
| 2004/0117715 A1 | 6/2004 | Ha et al. |
| 2004/0133487 A1 | 7/2004 | Hanagan et al. |
| 2004/0193594 A1 | 9/2004 | Moore et al. |
| 2004/0199486 A1 | 10/2004 | Gopinath et al. |
| 2004/0250212 A1 | 12/2004 | Fish |
| 2005/0001911 A1 | 1/2005 | Suzuki |
| 2005/0021690 A1 | 1/2005 | Peddada |
| 2005/0076066 A1 | 4/2005 | Stakutis et al. |
| 2005/0166179 A1 | 7/2005 | Vronay et al. |
| 2005/0240592 A1 | 10/2005 | Mamou et al. |
| 2005/0251540 A1 | 11/2005 | Sim-Tang |
| 2005/0262097 A1 | 11/2005 | Sim-Tang et al. |
| 2005/0262188 A1 | 11/2005 | Mamou et al. |
| 2005/0286440 A1 | 12/2005 | Strutt et al. |
| 2006/0020586 A1 | 1/2006 | Prompt et al. |
| 2006/0026220 A1 | 2/2006 | Margolus |
| 2006/0050970 A1 | 3/2006 | Gunatilake |
| 2006/0064416 A1 | 3/2006 | Sim-Tang |
| 2006/0101384 A1 | 5/2006 | Sim-Tang et al. |
| 2006/0130002 A1 | 6/2006 | Hirayama et al. |
| 2006/0137024 A1 | 6/2006 | Kim et al. |
| 2006/0236149 A1 | 10/2006 | Nguyen et al. |
| 2006/0259820 A1 | 11/2006 | Swoboda |
| 2006/0278004 A1 | 12/2006 | Rutt et al. |
| 2007/0067278 A1 | 3/2007 | Borodziewicz et al. |
| 2007/0094312 A1 | 4/2007 | Sim-Tang |
| 2007/0168692 A1 | 7/2007 | Quintiliano |
| 2007/0185922 A1 | 8/2007 | Kapoor et al. |
| 2007/0214191 A1 | 9/2007 | Chandrasekaran |
| 2008/0256138 A1 | 10/2008 | Sim-Tang |
| 2010/0031274 A1 | 2/2010 | Sim-Tang |
| 2010/0146004 A1 | 6/2010 | Sim-Tang |
| 2011/0252004 A1 | 10/2011 | Sim-Tang |
| 2011/0252432 A1 | 10/2011 | Sim-Tang et al. |
| 2012/0254659 A1 | 10/2012 | Sim-Tang |
| 2012/0266019 A1 | 10/2012 | Sim-Tang |
| 2012/0284238 A1 | 11/2012 | Sim-Tang |

OTHER PUBLICATIONS

Otlu, "A New Technique: Replace Algorithm to Retrieve a Version from a Repository Instead of Delta Application", Thesis, The Graduate School of Natural and Applied Sciences, The Middle East Technical University, Apr. 2004.

Kurtz et al., "Delta Comprehension Algorithms for Diverse Environments", 2006, 8 pages.

U.S. Appl. No. 11/185,168, filed Jul. 20, 2005, Sim-Tang.

U.S. Appl. No. 11/185,313, filed Jul. 20, 2005, Siew Yong Sim-Tang.

U.S. Appl. No. 12/099,837, filed Apr. 9, 2008, Sim-Tang, Siew Yong.

U.S. Appl. No. 12/696,691, filed Jan. 29, 2010, Sim-Tang.

U.S. Appl. No. 10/862,971, filed Jun. 8, 2004, Sim-Tang.

U.S. Appl. No. 12/845,215, filed Jul. 28, 2010, Sim-Tang.

U.S. Appl. No. 12/901,824, filed Oct. 11, 2010, Siew Yong Sim-Tang.

Housel et al. "WebExpress: A client/intercept based system for optimizing Web browsing in a wireless environment", Mobile Network and Applications, vol. 3, pp. 419-431, 1998, Baltzer Science Publishers.

Psounis, "Class-based Delta-encoding: A Scalable Scheme for Caching Dynamic Web Content", Proceedings of the 22nd International Conference on Distributed Computing Systems Workshops, 2002 IEEE (pp. 1-7).

Microsoft Windows Storage Server 2003, NSI Software, "Improving Business Continuity Using Windows Storage Server 2003", White Paper, Oct. 2003, pp. 1-15.

Burton H. Bloom, Space/Time Trade-offs in Hash Coding with Allowable Errors, Communications of the ACM, vol. 13/No. 7/Jul. 1970, pp. 422-426.

Beausoliel, Rob, "International Search Report" for PCT/US05/15651 as mailed Sep. 29, 2005. (1 page).

Abel-Jalil, Neveen, "International Search Report" for PCT/US05/32958 as mailed Jul. 8, 2008. (1 page).

Thomson, William, "International Search Report" for PCT/US05/39709 as mailed Oct. 16, 2007. (1 page).

Vo, Tim, "International Search Report" for PCT/US05/15662 as mailed Feb. 1, 2008. (2 pages).

Zhen, Li B., "International Search Report" for PCT/US05/15653 as mailed Nov. 30, 2006. (3 pages).

Thomas Plagemann, Towards Middleware Services for Mobile AD-HOC Network Applications, May 2003,IEEE (FTDCS'03), pp. 1-7.

* cited by examiner

PRIOR ART

1. INHERITED PROFILE
   - REPOSITORIES
     - REGION 1
       - REPOSITORY 1 —— PROFILE A —— HISTORY = 2 YRS.
       - REPOSITORY 2
         - DS 1
         HISTORY = 2 YRS.

FIRST PROFILE FOUND UP THE DMS TREE IS USED.

2. INHERITED PROFILE
   - REPOSITORIES
     - REGION 1
       - REPOSITORY 1 —— PROFILE A —— HISTORY = 2 YRS.
       - REPOSITORY 2 — PROFILE B —— HISTORY = 6 MO.
         - DS 1
         HISTORY = 6 MO.

NEAREST PARENT WINS.

3. ATTRIBUTE OVERRIDE
   - REPOSITORIES
     - REGION 1
       - REPOSITORY 1 —— PROFILE A —— HISTORY = 2 YRS.
       - REPOSITORY 2
         - DS 1 — ATTRIBUTE OVERRIDE – HISTORY = 6 MO.
         HISTORY = 6 MO.

ATTRIBUTE SET DIRECTLY ON OBJECT OVERRIDES VALUE FROM INHERITED PROFILE.

4. LOCKED ATTRIBUTE
   - REPOSITORIES
     - REGION 1
       - REPOSITORY 1 —— PROFILE A —— HISTORY = 2 YRS 🔒
       - REPOSITORY 2 — PROFILE B —— HISTORY = 6 MO.
         - DS 1
         HISTORY = 2 YRS.

A LOCKED ATTRIBUTE FROM A FARTHER PARENT OVERRIDES THE VALUE FROM A CLOSER PARENT.

5. BLOCKING LOCKS FROM PARENTS
   - REPOSITORIES
     - REGION 1
       - REPOSITORY 1 —— PROFILE A —— HISTORY = 2 YRS.🔒
       - REPOSITORY 2 — PROFILE B —— BLOCKED INHERITED LOCKS = TRUE
         - DS 1                      HISTORY = 6 MO.
         HISTORY = 6 MO.

THE PROFILE CAN BLOCK LOCKED ATTRIBUTES FROM TAKING EFFECT.

FIG. 17

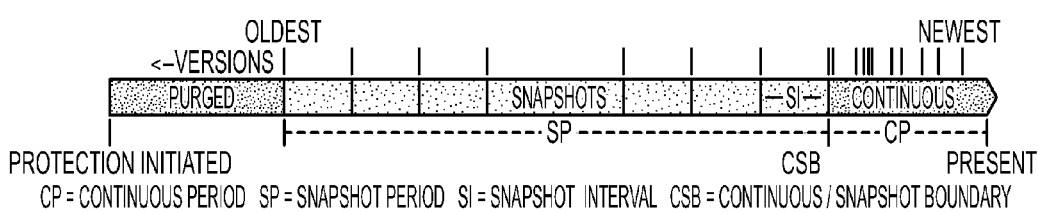

FIG. 18

MANAGEMENT INTERFACE FOR A SYSTEM THAT PROVIDES AUTOMATED, REAL-TIME, CONTINUOUS DATA PROTECTION

CROSS-REFERENCE TO RELATED APPLICATIONS

This patent application is a continuation of U.S. patent application Ser. No. 11/264,110, now U.S. Pat. No. 7,904,913, filed on Nov. 1, 2005. U.S. patent application Ser. No. 11/264,110 claims priority from of U.S. Provisional Patent Application No. 60/624,358, filed on Nov. 2, 2004. This patent application is related to commonly owned U.S. Pat. No. 7,096,392, issued Aug. 22, 2006. This patent application is related to commonly owned U.S. patent application Ser. No. 11/123,994, now U.S. Pat. No. 8,108,429, filed on May 6, 2005. U.S. patent application Ser. No. 11/264,110, U.S. Provisional Patent Application No. 60/624,358, and U.S. patent application Ser. No. 11/123,994 are incorporated herein by reference.

BACKGROUND OF THE INVENTION

1. Technical Field

The present invention relates generally to enterprise data protection.

2. Background of the Related Art

A critical information technology (IT) problem is how to cost-effectively deliver network wide data protection and rapid data recovery. In 2002, for example, companies spent an estimated $50B worldwide managing data backup/restore and an estimated $30B in system downtime costs. The "code red" virus alone cost an estimated $2.8B in downtime, data loss, and recovery. The reason for these staggering costs is simple—traditional schedule based tape and in-storage data protection and recovery approaches can no longer keep pace with rapid data growth, geographically distributed operations, and the real time requirements of 24×7×265 enterprise data centers.

Although many enterprises have embarked on availability and recovery improvement programs, many of these programs have been focused on the redundancy of the infrastructure, not on the data itself. Yet, without data availability, applications cannot be available.

Today's legacy data protection and recovery solutions are highly fragmented across a wide variety of applications, systems, and storage models. The overhead and data management maze that existing approaches bring to the network, storage, tape, and application infrastructure has caused increasing expenditures with little tangible returns for the enterprise. Worse, manual recovery techniques compound the problem with the same issues that cause downtime in the first place—human errors and process issues constitute 80% of unplanned downtime.

As a result, businesses are enduring high costs, high risk, and a constant drag on productivity. A recent survey by Aberdeen highlights IT managers' top data storage problems: managing backup and restore (78%), deploying disaster recovery (80%), and delivering required service levels (60%).

One recently-introduced technique for addressing the complex problem of providing heterogeneous, enterprise-wide data management is illustrated in FIG. 1. FIG. 1 illustrates a representative enterprise 100 in which a data management system (DMS) is implemented to provide enterprise data protection. A commercial version of this architecture is available from Asempra Technologies, Inc., of Sunnyvale, Calif. In this illustrative example, an enterprise 100 comprises a primary data tier 102 and a secondary data tier 104 distributed over IP-based wide area networks 106 and 108. Wide area network 106 interconnects two primary data centers 110 and 112, and wide area network 108 interconnects a regional or satellite office 114 to the rest of the enterprise. The primary data tier 102 comprises application servers 116 running various applications such as databases, email servers, file servers, and the like, together with associated primary storage 118 (e.g., direct attached storage (DAS), network attached storage (NAS), storage area network (SAN)). The secondary data tier 104 typically comprises one or more data management server nodes, and secondary storage 120, which may be DAS, NAS, and SAN. The secondary storage may be serial ATA interconnection through SCSI, Fibre Channel (FC or the like), or iSCSI. The data management server nodes create a logical layer that offers object virtualization and protected data storage. The secondary data tier is interconnected to the primary data tier, preferably through one or more host drivers to provide real-time data services. Data management policies 126 are implemented across the secondary storage in a well-known manner. A similar architecture is provided in data center 112. In this example, the regional office 114 does not have its own secondary storage, but relies instead on the facilities in the primary data centers.

As described in commonly-owned U.S. Pat. No. 7,096,392, issued Aug. 22, 2006, the DMS system associates a "host driver" 128 with one or more of the application(s) running in the application servers 116 to transparently and efficiently capture the real-time, continuous history of all (or substantially all) transactions and changes to data associated with such application(s) across the enterprise network. This facilitates real-time, so-called "application aware" protection, with substantially no data loss, to provide continuous data protection and other data services including, without limitation, data distribution, data replication, data copy, data access, and the like. In operation, a given host driver 128 intercepts data events between an application and its primary data storage, and it may also receive data and application events directly from the application and database. The host driver 128 may be embedded in the host application server 116 where the application resides; alternatively, the host driver is embedded in the network on the application data path. By intercepting data through the application, fine grain (but opaque) data is captured to facilitate the data service(s). To this end, and as also illustrated in FIG. 1, each of the primary data centers includes a set of one or more data management servers 130a-n that cooperate with the host drivers 128 to facilitate the data services. The DMS servers provide a distributed object storage that can be built above raw storage devices, a traditional file system, a special purpose file system, a clustered file system, a database, or the like. In this illustrative example, the data center 110 supports a first core region 130, and the data center 112 supports a second core region 132.

As described in co-pending application Ser. No. 11/123,994, each DMS node executes an object runtime environment. This object runtime environment includes an object manager that manages the lifecycle of all the DMS objects during runtime. The object manager creates DMS objects, and the object manager saves them in the shared storage. The objects continually undergo modification as the system protects data in the enterprise's primary storage. In an illustrative embodiment, the system automatically creates a trail of objects called versions; typically, the versions do not actually exist on primary storage, outside of the data management system. The DMS manages the creation, storage, display, recovery to primary storage, deletion (automatic via policy, or manual) and the like, of these versions. The host drivers protect data into the continuous object data store. Using this architecture, data in primary storage can be recovered to any point-in-time.

The present invention is a management interface for use in an enterprise data management system such as described above.

BRIEF SUMMARY OF THE INVENTION

A data management system that protects data into a continuous object store includes a management interface having a time control. The time control is a mechanism, such as a linear timeline, a radial time dial, a calendar, or a search specification dialog, or a combination thereof, that allows an administrator to specify a "past" time, such as a single point or range. When the time control is set to a single point, a hierarchical display of data appears on a display exactly as the data existed in the system at that moment in the past. Preferably, the visualization includes both the structure of the hierarchy (e.g., if the protected data source is a file system, the identity of the directories and their files; if the protected data source is a relational database, the identity of the databases and their binary and log files), and also the contents of the data objects themselves (i.e., what was in the files and databases). The timeline also includes a zoom function to enable the user to view and set the time at a coarse granularity (e.g., a given day) or to view and set the time at a finer granularity (e.g., seconds). A search specification dialog allows the user to specify a time range as well as a point in time. This time range is then used as a display filter, so that only files meeting specified criteria are included in the display set. As an example, a user may search for "all files which had a size>a given value at some point in December 2004 and were deleted in January 2005."

The time control enables the management interface to operate within a history mode in which the display provides a visual representation of a "virtual" point in time in the past during which the data management system has been operative to provide the data protection service. In addition, the management interface can be toggled to operate in a real-time mode, which provides an active view of the most current protected data as it changes in real-time, typically driven by changes to primary storage. This real-time mode provides the user with the ability to view changes that occur to a set of data currently visible on the display screen. As an example, if the interface is displaying the contents of directory D1, and a file F1 in the directory is created on primary storage, then file F1 automatically appears in the display in the appropriate position in the data hierarchy.

The interface also allows an administrator to specify and manage policy including, without limitation, how long data is retained in the management system. A policy engine enables the user to assert "temporal-based" policy over data objects. As an example, an administrator may define a policy rule such as "retain all versions of all Excel files in the New York office for one month, then retain monthly snapshots of such files for the next eleven months, then purge all older versions." Preferably, a given policy is asserted by one or more policy attributes, and attributes are grouped and managed according to one or more policy profiles. The administrator may assert policy by associating policy profiles with data objects at any level in the hierarchy.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7B illustrates a representative display screen layout for the interface after a user has selected to view one or more versions of a particular data object;

FIGS. 9A and 9B illustrate the management interface when the user selects a history display mode;

FIG. 17 illustrates several examples of how policy profiles are managed;

FIG. 18 illustrates how retention policy may be enforced;

DETAILED DESCRIPTION OF AN ILLUSTRATIVE EMBODIMENT

Figure 1:
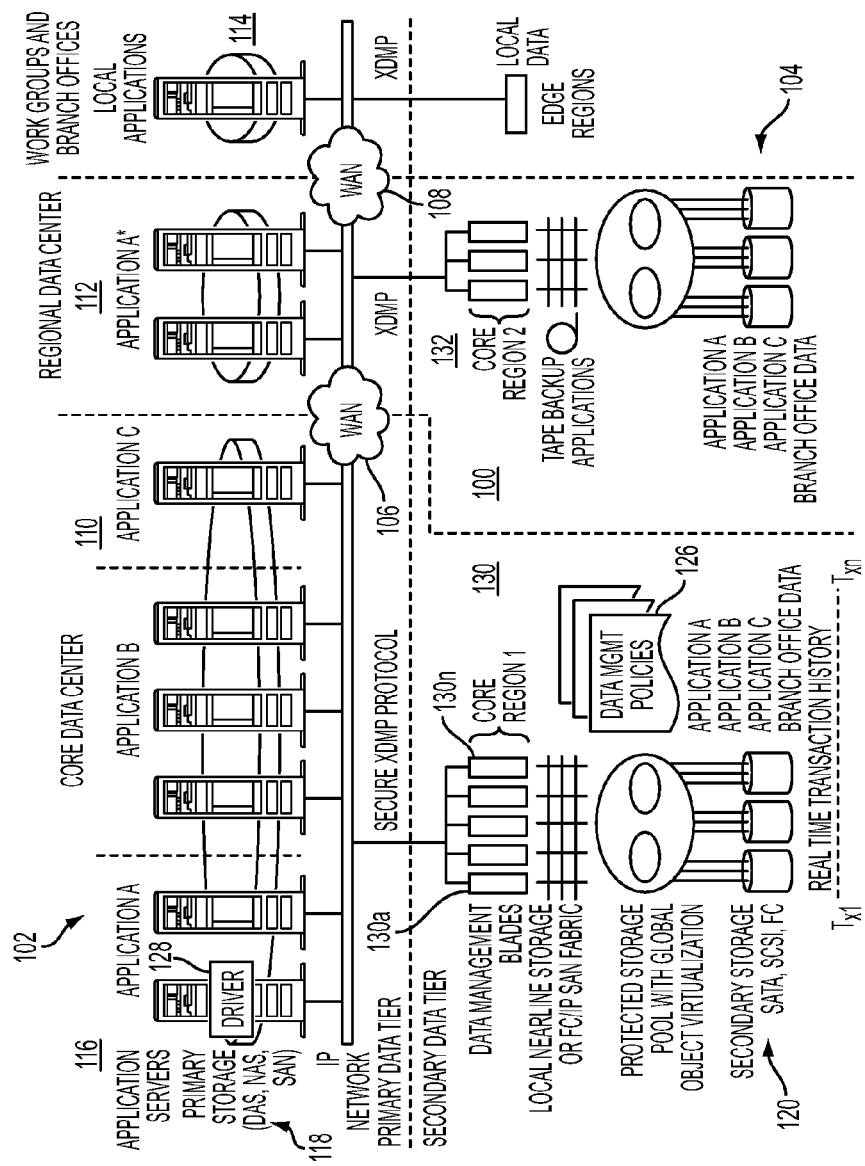
FIG. 1 is an illustrative enterprise network in which the present invention may be deployed.

As illustrated in FIG. 1, the present invention is now described in the context of a data management system (DMS) that is implemented as a network (a wide area network "cloud") of peer-to-peer DMS service nodes. The invention is not limited to use with such a system, however.

Figure 2:
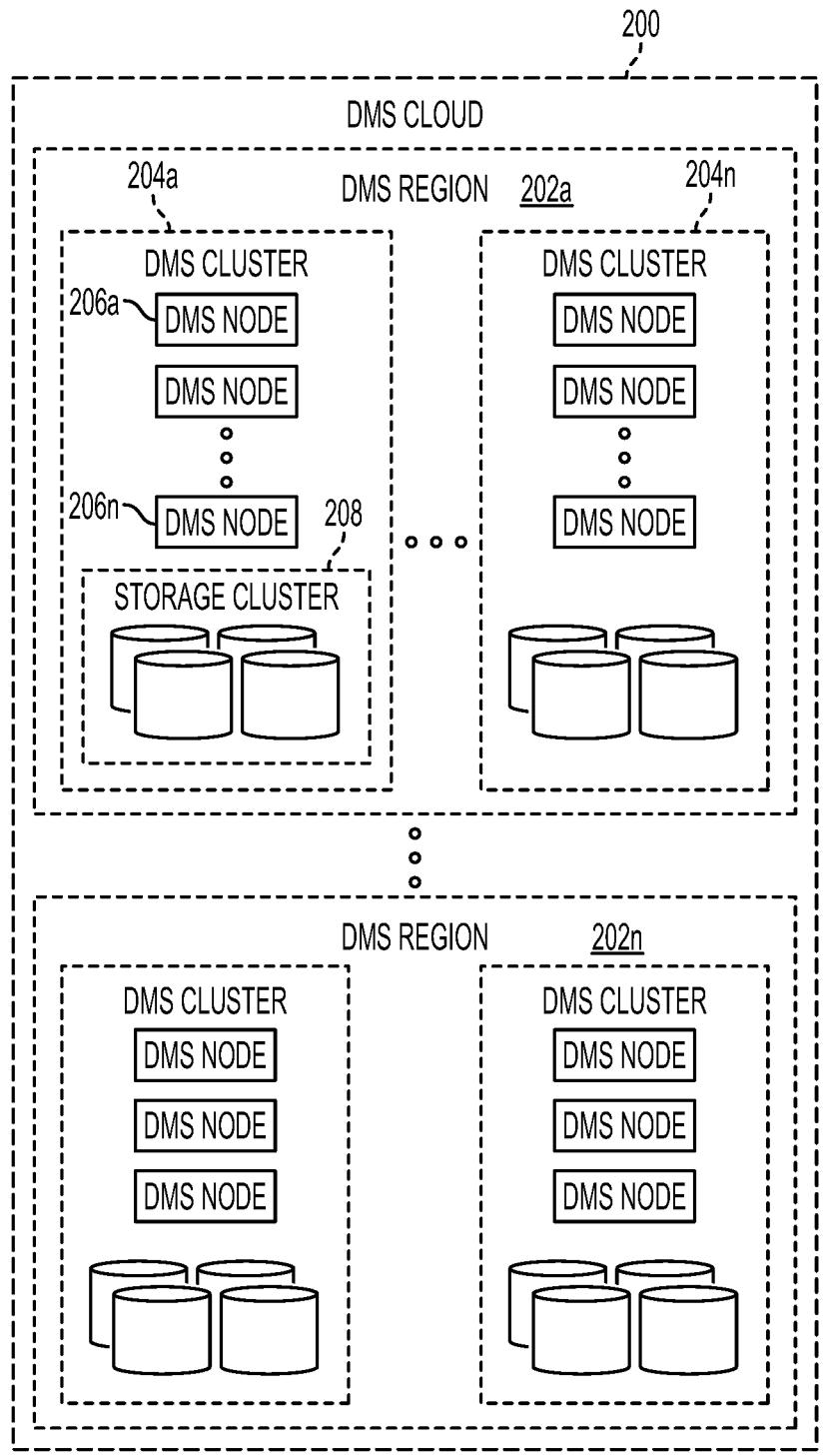
FIG. 2 is an illustration of a set of data management system nodes that comprise a continuous object data store.

By way of brief background, FIG. 2 illustrates a hierarchical structure of a data management system 200 in which the invention may be implemented. As illustrated, the data management system 200 comprises one or more regions 202*a-n*, with each region 202 comprising one or more clusters 204*a-n*. A given cluster 204 includes one or more nodes 206*a-n* and a shared storage 208 shared by the nodes 206 within the cluster 204. A given node 206 is a data management server as described above with respect to FIG. 1. Within a DMS cluster 204, preferably all the nodes 206 perform parallel access to the data in the shared storage 208. Preferably, the nodes 206 are hot swappable to enable new nodes to be added and existing nodes to be removed without causing cluster downtime. A cluster is a tightly-coupled, share everything grouping of nodes. At a higher level, the DMS is a loosely-coupled share nothing grouping of DMS clusters. Preferably, all DMS clusters have shared knowledge of the entire network, and all clusters preferably share partial or summary information about the data that they possess. Network connections (e.g., sessions) to one DMS node in a DMS cluster may be redirected to another DMS node in another cluster when data is not present in the first DMS cluster but may be present in the second DMS cluster. Also, new DMS clusters may be added to the DMS cloud without interfering with the operation of the existing DMS clusters. When a DMS cluster fails, its data may be accessed in another cluster transparently, and its data service responsibility may be passed on to another DMS cluster.

Figure 3:
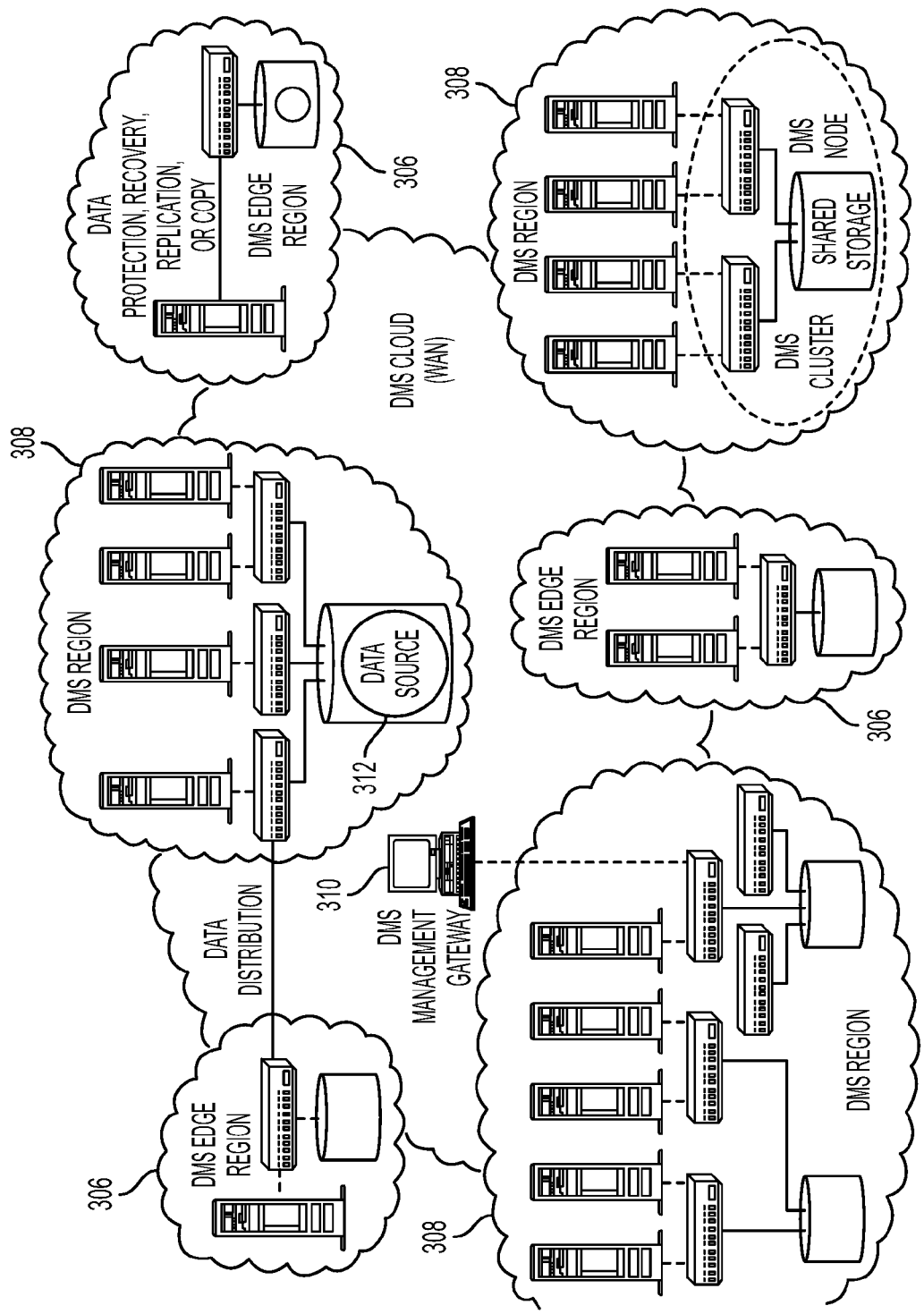
FIG. 3 is a representative DMS network having a management gateway according to one embodiment of the present invention.

With reference to FIG. 3, the DMS cloud 300 typically comprises one or more DMS regions, with each region comprising one or more DMS "clusters." In the illustrative embodiment of FIG. 3, typically there are two different types of DMS regions, in this example an "edge" region 306 and a "core" region 308. This nomenclature is not to be taken as limiting, of course. As illustrated in FIG. 1, an edge region 306 typically is a smaller office or data center where the amount of data hosted is limited and/or where a single node DMS cluster is sufficient to provide necessary data services. Typically, core regions 308 are medium or large size data centers where one or more multi-node clusters are required or desired to provide the necessary data services. The DMS preferably also includes one or more management gateways 310 for controlling the system. As seen in FIG. 3, conceptually the DMS can be visualized as a set of data sources 312. A data source is a representation of a related group of fine grain data. For example, a data source may be a directory of files and subdirectory, or it may be a database, or a combination of both. A data source 312 inside a DMS cluster captures a range of history and continuous changes of, for example, an external data source in a host server. A data source may reside in one cluster, and it may replicate to other clusters or regions based on subscription rules. If a data source exists in the storage of a DMS cluster, preferably it can be accessed through any one of the DMS nodes in that cluster. If a data source does not exist in a DMS cluster, then the requesting session may be redirected to another DMS cluster that has the data; alternatively, the current DMS cluster may perform an on-demand replication to bring in the data.

As described in co-pending application Ser. No. 11/123, 994, which is incorporated herein by reference, the DMS nodes create distributed object storage to provide real-time data management services. The distributed object store can be built above raw storage devices, a traditional file system, a special purpose file system, a clustered file system, a database, and so on. Preferably, DMS builds the distributed object store over a special purpose file system for storage and access efficiency. Each DMS node executes an object runtime environment. This object runtime environment includes an object manager that manages the lifecycle of all the DMS objects during runtime. The object manager creates DMS objects, which are sometimes referred to active objects, and the object manager saves them in the shared storage. The objects continually undergoing modification as the system protects data in the enterprise's primary storage. In an illustrative embodiment, the system automatically creates a trail of objects called versions (typically, the versions do not actually exist on primary storage, outside of the data management system). The DMS manages the creation, storage, display, recovery to primary storage, deletion (automatic via policy or manual) and the like, of these versions.

According to the present invention, as illustrated in FIG. 3, the DMS includes one or more management gateways to enable enterprise administrators (or others) to manage system administration and operation, preferably of the entire DMS network (including, for example, multiple regions, clusters, nodes and storage devices) and its protected data. A management gateway is a data management application platform that provides to a user, through a viewer, a graphical user interface (GUI) for displaying a real-time object catalog for user management of the DMS and to facilitate data recovery. As will be described, the GUI includes a time control, such as a timeline, for navigating data over a range of time. The GUI presents a consistent state of the data as it was at the time the administrator selects on the timeline—both the structure of the data hierarchy (names, existence of objects, and container relationships), and also the data itself (contents of versions). Thus, the GUI presents the data hierarchy as it was at the selected point in time on the time control.

Figure 4:
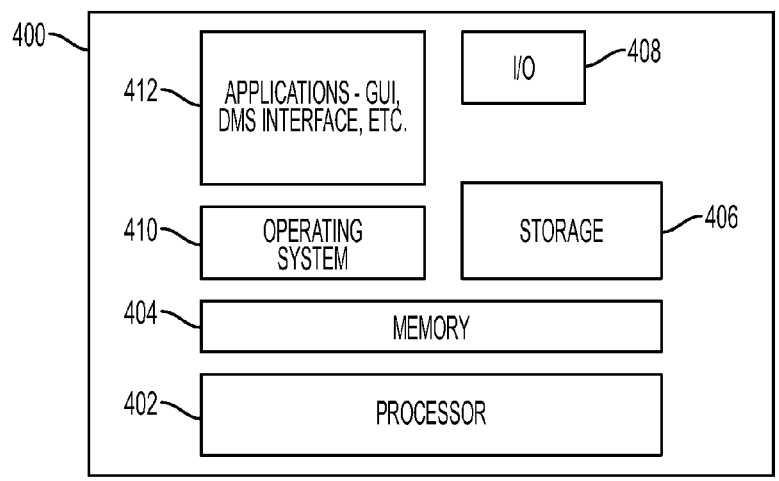
FIG. 4 is a block diagram of a management console for use in the present invention.

FIG. 4 illustrates components of a representative management gateway in an illustrative embodiment of the present invention. A management gateway is a data processing system 400 having one or more processors 402, suitable memory 404 and storage devices 406, input/output devices 408, an operating system 410, and one or more applications 412. One output device is a display that supports a windows-based graphical user interface (GUI). The data processing system includes hardware and software components to facilitate connectivity of the machine to the public Internet, a private network, or any other communications network. In a representative embodiment, the data processing system is a Pentium-based personal computer executing a suitable operating system such as Linux or Windows XP. Of course, any convenient processor and operating system platforms may also be used.

Figure 5:
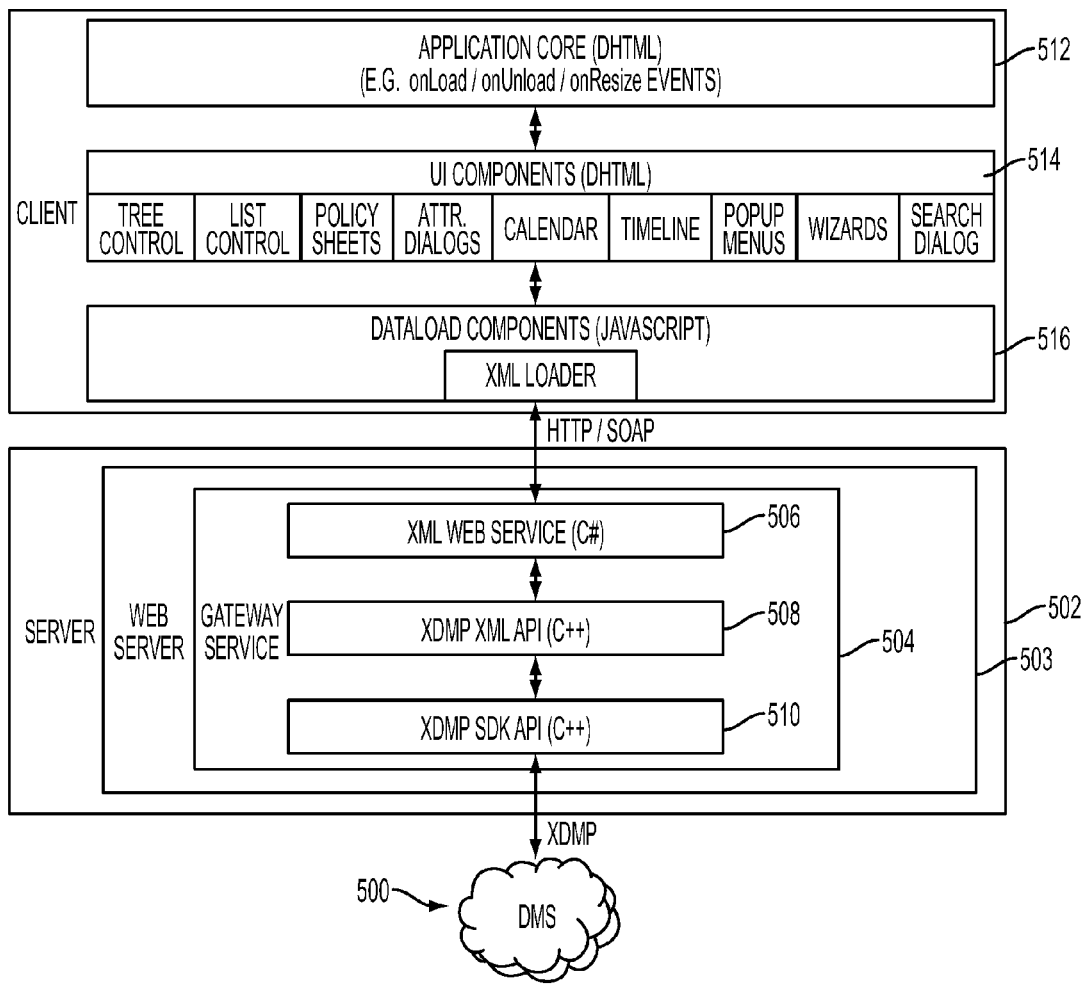
FIG. 5 is a block diagram of various software modules that may be used to retrieve information about the data objects from DMS and export such information to user interface viewers in an illustrated embodiment.

The management gateway can be a standalone device, or it can operate as a server to which one or more client machines are connected. FIG. 5 illustrates one embodiment wherein the management gateway operates as a server to which one or more client machines can connect to view the data. In FIG. 5, DMS 500 exports the data to the server platform 502, which supports a Web server 503 (e.g., Microsoft IIS, Apache, or the like), and a gateway service 504. The gateway service 504 includes an XML web service component 506, a DMS transport protocol (XDMP) XML API module 508, and an XDMP SDK API module 510. The XDMP components interface with the DMS. In this embodiment, end user client machines (e.g., commodity PCs having Web browsers) connect to the server via HTTP or SOAP. The client side comprises an application core module 512, the UI components 514, and a data load component module 516.

With the above as background, the following section describes an illustrated graphical user interface (GUI) for use in the data management system. As will be seen, the GUI comprises various screen layouts, buttons, wizards, and other graphic display elements that enable an administrator to navigate through time in a unique manner as will now be described and illustrated.

Button Bar

Figures 6, 7A:
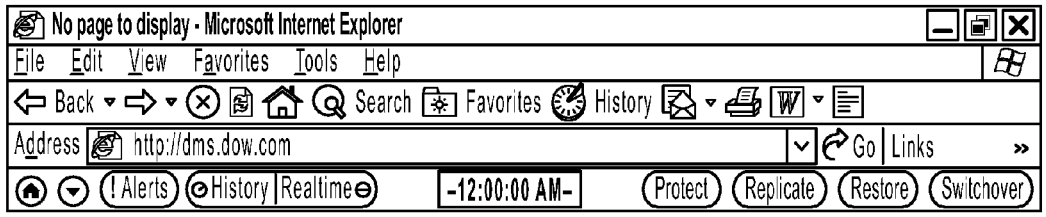
FIG. 6 is a GUI button bar that includes a set of controls for the management interface.
FIG. 7A illustrates a representative display screen layout for the management interface.

Controls and information preferably are always visible in a Button Bar at the top of the display window, as illustrated in FIG. 6. The table that follows describes the controls on the Button Bar, from left to right.

Home Resets the UI to the default state: Realtime mode, Repositories selected, all Regions collapsed.

Pulldown Menu A context-sensitive menu, with the basic commands that apply to the objects currently being displayed, such as Create, Delete, Move, etc.

alerts Displays an Alerts screen.

Realtime/History Mode Toggles the Management Console between realtime mode, in which the UI tracks the current state of the data in the DMS, and history mode, in which the UI presents the data as of a particular time (down to the second) in the past.

Current Time Shows the current DMS time. The background is green in Realtime Mode, orange in History mode.

Task Buttons The Protect, Replicate, Recover and Switchover buttons bring up wizards to perform their respective actions.

Screen Layout

By default the UI preferably comprises a Left Pane containing trees of selectable objects, and a Center Pane listing of the contents of the selected object, as illustrated in FIG. 7A.

Left Pane

The Left Pane preferably displays browse-able trees of selectable objects. The tabs at the bottom preferably allow the user to switch between three views:

DMS. Data objects in the DMS: Data Cloud, Regions, Repositories, Data sources.

Policy. Policy Profile documents, which are associated with data objects.

Network. Physical components of the DMS: Regions, Clusters, Nodes.

The DMS view preferably displays two trees:

Repositories. The logical hierarchy of data in the DMS: Data sources are organized into (possibly nested) Repositories, which reside in Regions.

Servers. Shows all the Data sources under the Servers their data originates from.

Preferably, all DMS-enabled Servers are shown, grouped by Region. Servers in each Region for which data protection has not yet been enabled are shown under Unprotected Servers.

Center Pane

The Center Pane preferably displays information for the object selected in the Left Pane. For data objects (i.e. when the DMS Tab is current) preferably there are several views:

Protected Data. Data objects, including, without limitation, repositories, data sources, directories, files, databases, database objects, Exchange storage groups, Exchange databases, user mailboxes, messages, user calendars and the like.

Replicas. Present when the selected object has one or more replicas.

Audit Log. Shows events related to the object selected in the Left Pane.

Graphs & Reports.

The information viewed in the Center Pane is controlled by the View Menu and the Column Menu.

Right Pane

Figure 8A:
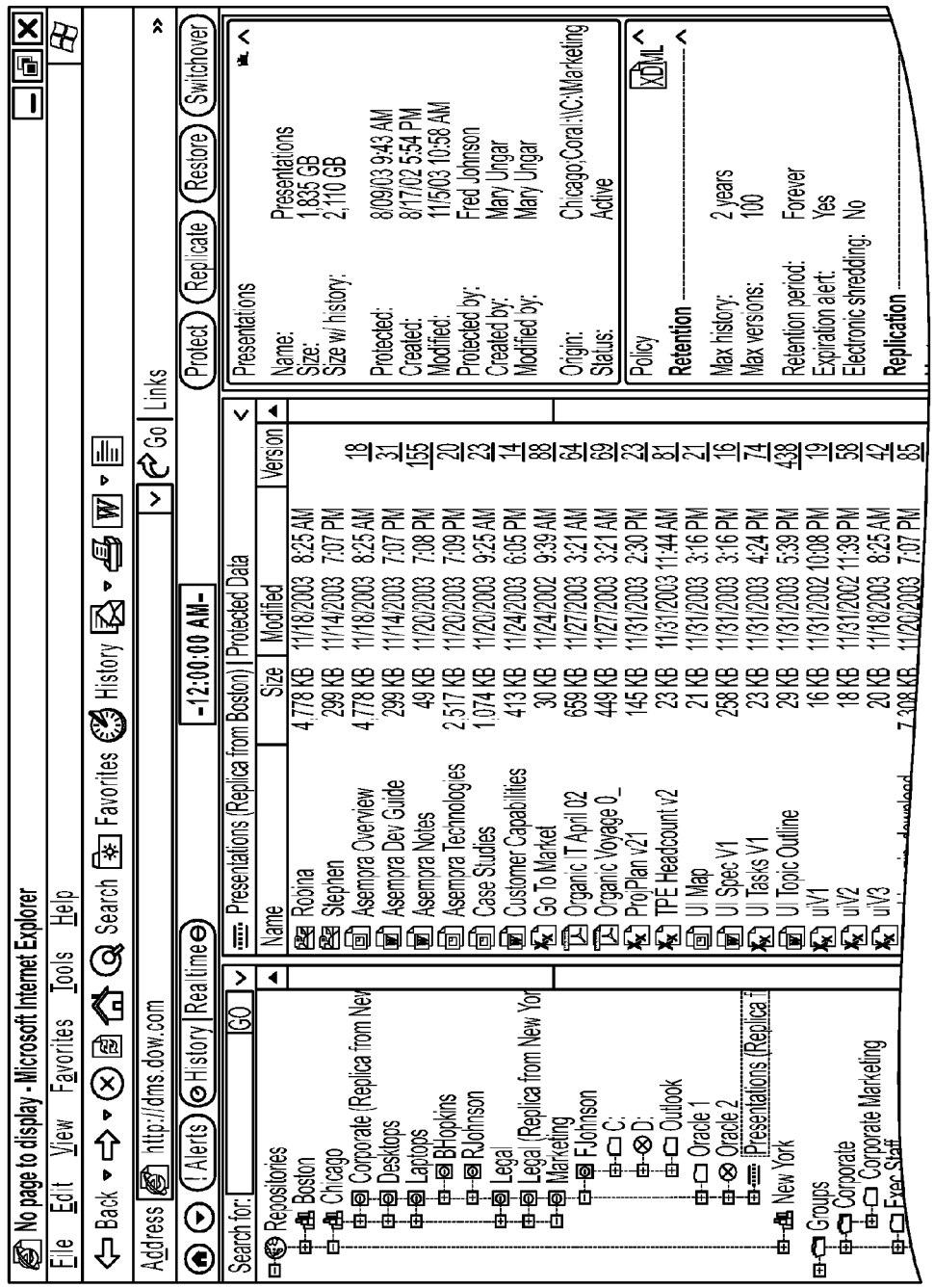
FIGS. 8A and 8B illustrate an additional control panel for use in policy management.
Figure 8B:
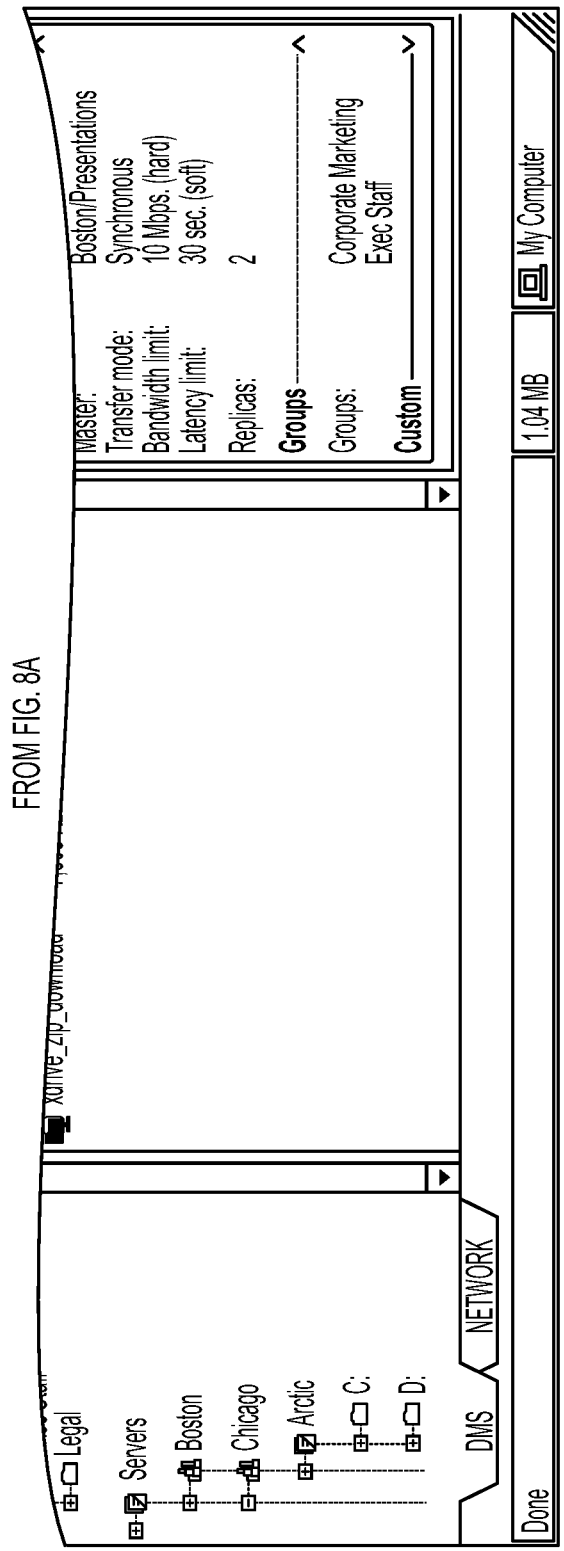

The Right Pane displays information pertaining to the object selected in the Left or Center panes. The information preferably is presented as two property sheets, the Info Sheet and Policy Sheet. Display of the Right Pane is controlled by the arrow at the right of the center pane. Initially, preferably the Right Pane is not displayed, and the arrow points to the left. Clicking it displays the Right Pane, as illustrated in FIGS. 8A and 8B.

When the Right Pane is displayed, the arrow in the Center Pane points to the right, and clicking it preferably hides the Right Pane.

Navigation Through Time

The two principal mechanisms for navigating the DMS history are 1) drilling down into object versions, and 2) going into History Mode and explicitly changing the current DMS time. Where the data source being protected is a file system, the "versions" are file versions, and a particular file version is created when a file is modified and closed. Where the data source is a database, a particular "version" is created whenever the database is checkpointed, quiesced or shut down, as the case may be.

Data Object Versions

Figure 7B:
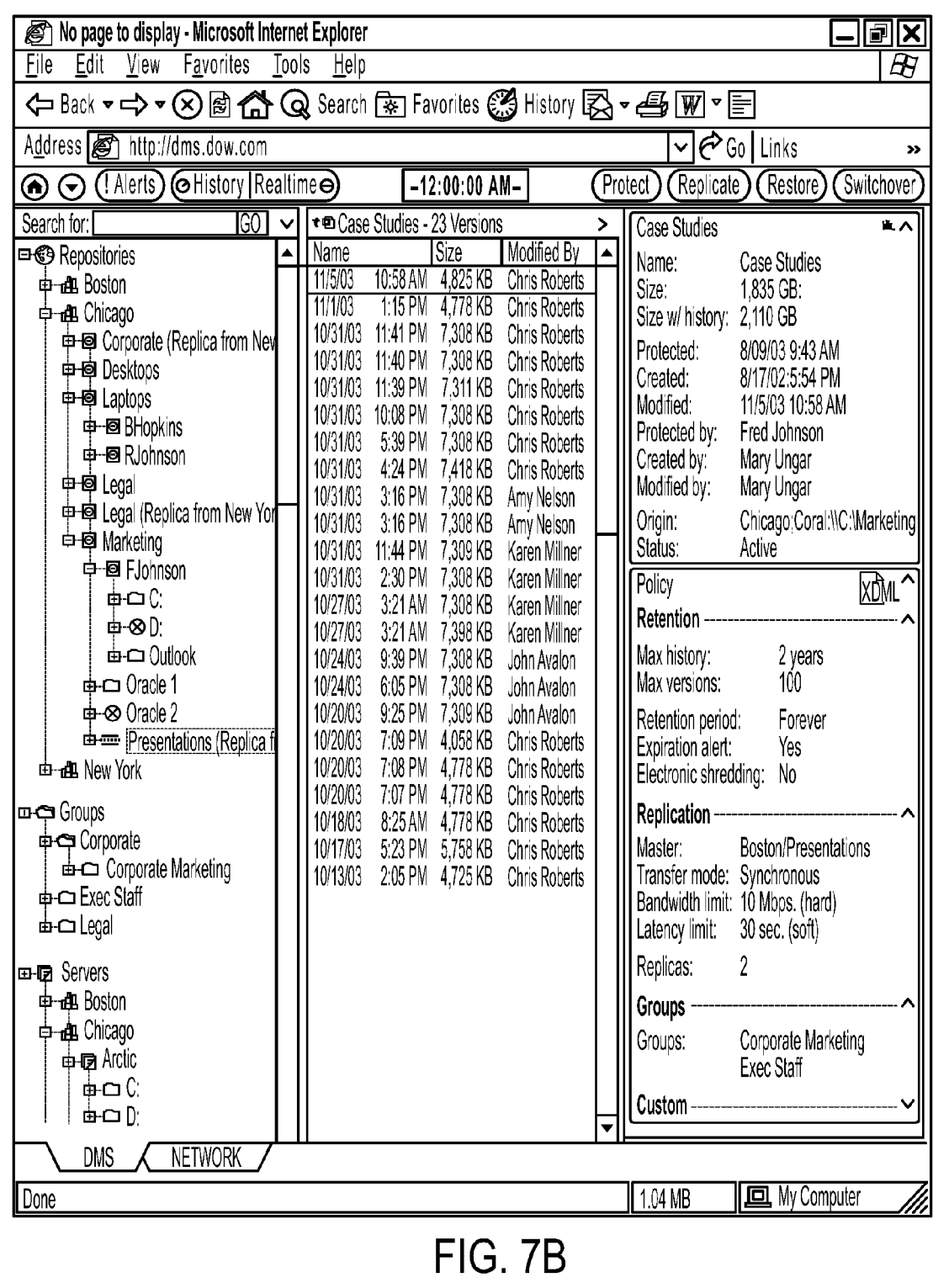

Whenever data objects (such as files or databases) are displayed in the Center Pane, preferably there is a Versions column with the number of versions for the object, up to the current DMS time (in real-time mode) or the selected time (in history mode) for each data object. By clicking that number, the user can drill down into a listing of all the versions. This is illustrated in FIG. 7B. Preferably, DMS automatically creates versions as the data object changes. By visually scanning the list of versions, going back from the present, this portion of the GUI facilitates simple time-based navigation. A more powerful time navigation mechanism is provided by a History mode, which is now described.

Users with appropriate permissions may view the contents of any version, e.g., by issuing an Open command for that version, or by means of a menu or accelerator such as double-clicking on the version. The management interface then invokes a viewing application capable of displaying the data appropriately, and preferably displays the read-only data in a separate window, which may be tiled or overlapping in relation to the Left, Right and Center panes. Thus, the console can show the number of versions at any point in history, and the user can drill down to see the version list at any point in history and then return to a previous level.

History Mode & Timeline

Figure 9A:
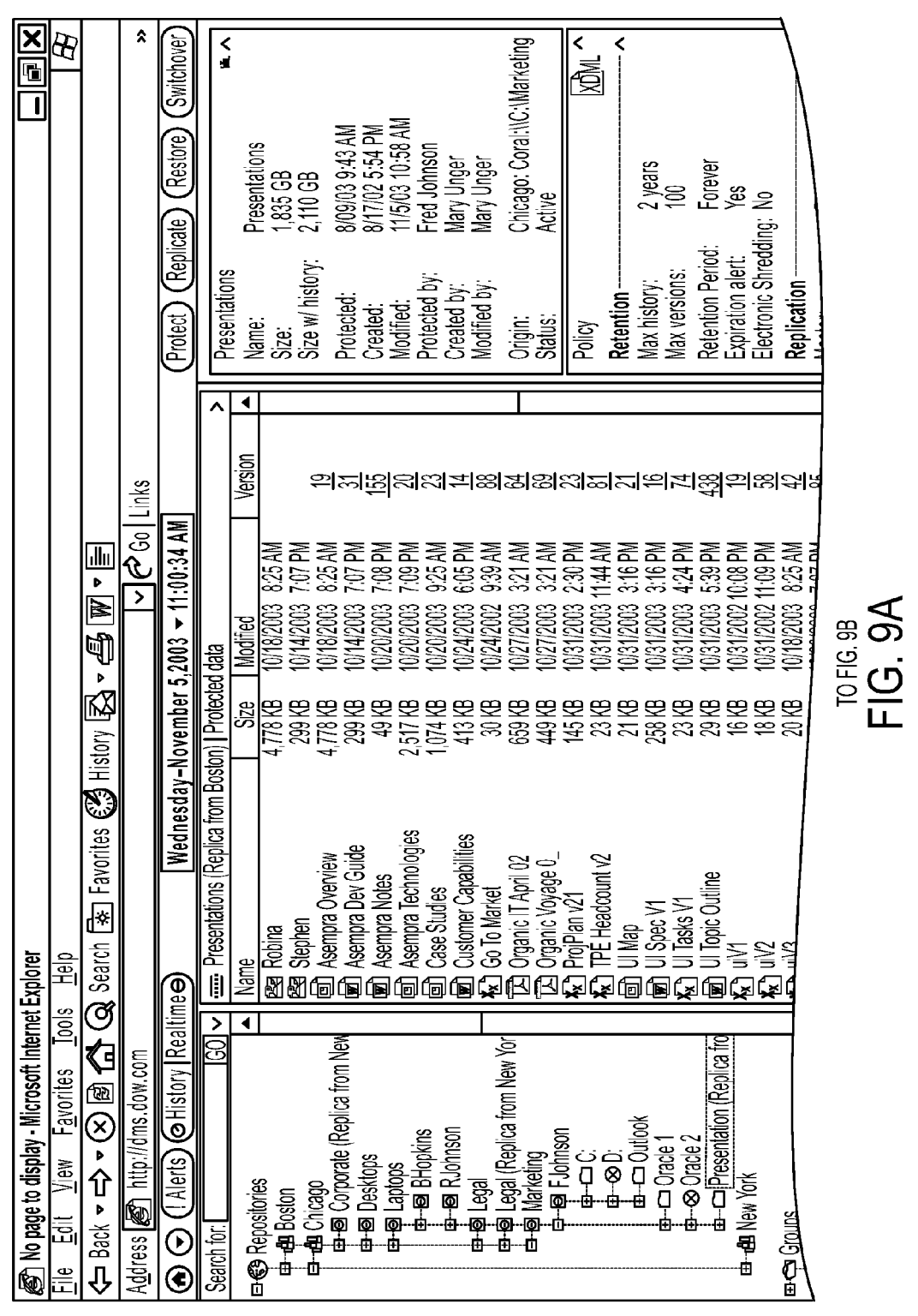
Figure 9B:
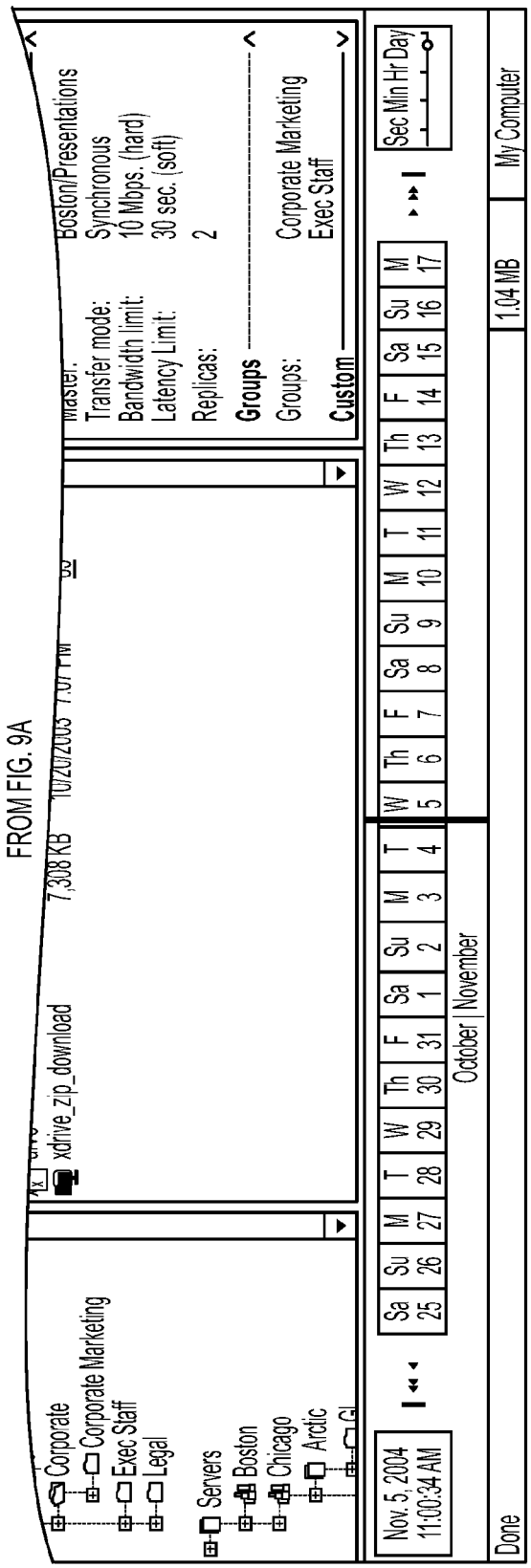

Clicking History toggles the system from Realtime mode to History mode, as illustrated in FIGS. 9A and 9B.

While in History mode, the user can navigate through the entire time span covered by the DMS by means of 1) the Timeline or 2) a Calendar popup, which is accessed by clicking anywhere in the Time display above the Center Pane.

Date/Time Links

The UI displays the timestamps associated with various data objects—e.g. the time a file was last modified, or the time an event occurred. An event can be a consistent checkpoint (e.g., file close, a database checkpoint or quiesce, or the like), a software upgrade, a virus detector alert, a business-associated event, or the like. Whenever such a timestamp is onscreen, the user can right-click to pop up a menu and select Go To this date & time to enter History mode and navigate to that time.

Timeline and Calendar

This section further describes the Timeline and Calendar for navigating through time in History mode.

Timeline

Figure 10:
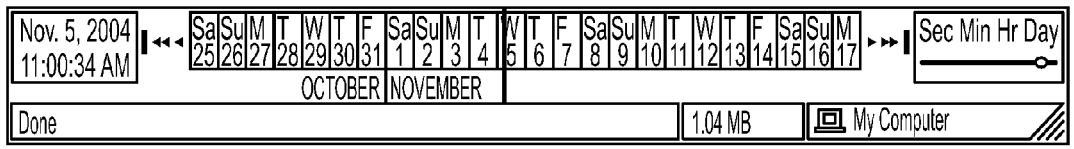
FIG. 10 illustrates a time control in the form of a timeline that is part of the management interface.

The Timeline preferably appears at the bottom of the window in History mode, as illustrated in FIG. 10. This is not a limitation, however.

The Timeline is used to control the current system time—i.e., the moment in time which is taken as the lens through which to view the data in the DMS. The current system time is shown by a current system time indicator (CSTI)—preferably a vertical red bar. In some views, the current unit box in the timeline is also highlighted, as shown above.

Timeline Components

The Timeline preferably contains the following controls and display areas, from left to right:

Current Time Box. Displays the current system time, including month, day, year, hour, minute, second, and AM/PM.

Figure 11:
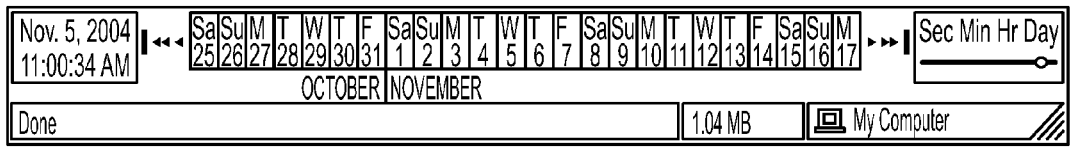
FIG. 11 illustrates an operation of a beginning time button control.

Beginning Time Button. Button in the form of a vertical bar that, when clicked, scrolls to show the earliest protection date at far left, with the CSTI at the left edge of the timeline, as illustrated in FIG. 11.

Scroll Back Far Button. Button in the form of a double-left-arrow that, when clicked, scrolls one full "timeline full" backward in time—i.e. the contents of the Timeline animate quickly and smoothly such that the time that was displayed on the far left of the timeline moves all the way to the far right.

Scroll Back Single Unit Button. Button in the form of a single-left-arrow that, when clicked, scrolls a single unit backward in time.

Timeline. Bar in the center that shows a number of units in the current zoom level. The bar length is adjusted as needed so the entire Timeline fits the current window width.

Current System Time Indicator. A vertical red bar within the Timeline showing the current system time. Clicking elsewhere in the Timeline causes the CSTI to jump to the new location on mouse up. The CSTI can also be dragged to a new location. Dragging off either edge causes the Timeline contents to auto-scroll in the appropriate direction.

Scroll Forward Single Unit Button. Button in the form of a single-left arrow that, when clicked, scrolls a single unit forward in time.

Scroll Forward Far Button. Button in the form of a double-right-arrow that, when clicked, scrolls one full "timeline full" forward in time—i.e. the contents of the Timeline animate quickly and smoothly such that the time that was displayed on the far right of the timeline moves all the way to the far left.

Figure 12:
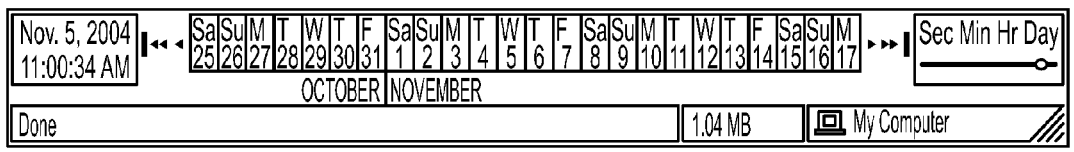
FIG. 12 illustrates an operation of a now button control.

Now Button. Button in the form of a vertical bar that, when clicked, scrolls to show the current time at far right, with the CSTI at the right edge of the timeline, as illustrated in FIG. 12.

Zoom Level Box. Allows the user to select one of four zoom levels: Second, Minute, Hour, Day.

Timeline Operation

The Timeline slides smoothly on and off the bottom edge of the window when the user toggles between History and Realtime modes.

Scrolling via any of the forward/back buttons, and changing the zoom level, preferably has no effect on the current DMS time.

Preferably, all of the arrow buttons have auto-repeat behavior. That is, the first unit of animated scrolling occurs immediately on mouse-down, then, after a short pause, the scrolling continues smoothly, ending on mouse-up. So clicking scrolls one unit, pressing and holding scrolls continuously.

Double-clicking anywhere within the Timeline proper zooms in one level; Shift-double-click zooms out one level.

Timeline Views

Figure 13:
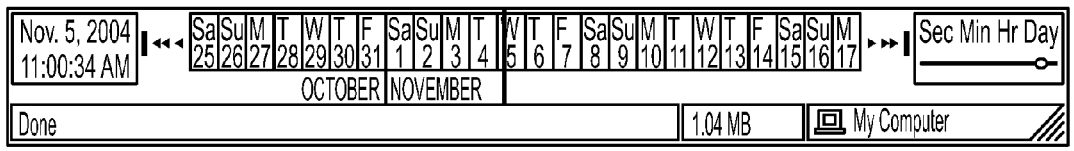
FIG. 13 illustrates a day timeline view.

By default, preferably the Timeline is in Day View, as illustrated in FIG. 13.

The CSTI preferably is in the middle of the current day, which is highlighted.

Figure 14:
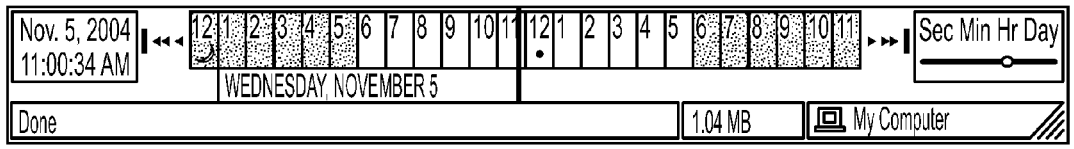
FIG. 14 illustrates an hour timeline view.

An Hour view is illustrated in FIG. 14.

The CSTI preferably is in the middle of the current hour, which is highlighted.

Figure 15:
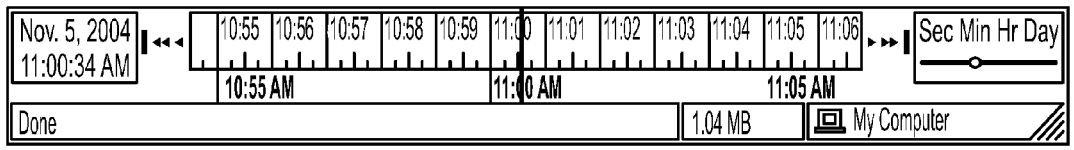
FIG. 15 illustrates a minute timeline view.

A Minute view is illustrated in FIG. 15.

The CSTI preferably is located on a vertical line or tick-mark.

Figure 16:
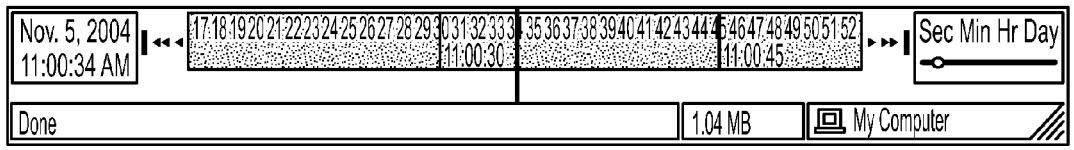
FIG. 16 illustrates a second timeline view.

A Seconds view is illustrated in FIG. 16.

The CSTI preferably is located on one of the bright green second indicators.

Operations in History Mode

In one embodiment, clicking the Protect, Replicate, or Switchover buttons in History mode brings up a dialog allowing the user to either switch to Realtime mode and continue with the Wizard, or cancel.

Thus, according to a feature of the present invention, the DMS management interface provides a "time control" that allows the user to specify a time (either single point or range) in the past. When the time control is set to a single point, then a familiar hierarchical display of data appears exactly as it was in reality at that moment in the past. Preferably, this display includes both the structure of the hierarchy (e.g., in a file system data source, which directories and files existed; in a database data source, the identity of the databases and their associated binary and log files), as well as the contents of the data objects themselves (i.e., what was in the files and databases). Although the embodiment described and illustrated using a linear timeline as the time control, this is not a limitation of the present invention. In the alternative, the time control may take other forms, such as the popup calendar described above, or a radial time dial, a calendar, or a search specification dialog. Regardless of the physical format, the timeline preferably includes the described zoom feature for "zooming out" to view and set the time at a courser granularity (e.g. day) and "zooming in" to view/set at a finer granularity (e.g. seconds).

Another form of time control is a search specification dialog. According to the invention, a search specification dialog allows the user to specify a time range as well as a point in time. This time range is then used as a display filter, so that only data objects meeting specified criteria are included in the display set. The display set may be presented as a flat list, or in the form of a filtered view of the data hierarchy (i.e. the volume/directory/file trees). The criteria can include, but are not limited to, creation date, modification date, deletion date, size, presence of a specified string within the data object, existence of the data object, and the like. The following are examples of how a user may navigate temporally by using the search specification dialog:

All files which had a size>1 MB at some point in December 2004 and were deleted sometime in January 2005

All files which contained the string "Valerie Flame" and were deleted during September 2003

All files existing in the directory user 1:C:\foo\bar at any point between Oct. 15, 2005 and Oct. 31, 2005

As described and illustrated above, the interface also displays timestamps associated with various data objects—e.g., the time a file was last modified, or the time an event occurred (an event may be a data consistency event, a software upgrade, virus detector alert, or the like). Whenever such a timestamp is onscreen, the user can right-click to pop up a menu and select Go To this date and time to enter History mode and navigate to that time.

As has been described, the time navigation capabilities described above comprise a "history mode" in which the "virtual time" is different from the actual real-time. The management interface also provides an active view of the DMS data as it changes in realtime, typically driven by changes to primary storage. This is the Realtime mode. In this mode, the management interface becomes aware of relevant changes to the DMS at periodic intervals. As used herein, preferably "relevant" means changes to the DMS that are in the current display set, the set of data currently visible on the screen. To give a concrete example, if the interface is displaying the contents of directory D1 and file D1/F1 is created on primary storage, then F1 will automatically appear in the display. The management interface may become aware of changes by polling the DMS and asking for data that has changed since a last update, or by having the DMS notify the interface of changes since a last notification. Regardless of which method is used, polling or notification, the set of changes must then be compared with the current display set to determine if any of the changes are within the display set. Whenever changes to the display set of detected, the display is updated automatically, and the current time indicator is updated to reflect the time of last updating.

Policy Management

The management interface allows the administrator to specify and manage policy including, without limitation, how long data is retained in the system, preferably by means of a policy engine that is sensitive to "time-based" or "temporal" constraints. The policy engine enables the administrators to define temporal-based policies such as the following:

Retain all versions of all files/emails containing the word "Flame" forever

Purge all versions of all files/emails containing the word "Flame" from both the DMS and primary storage after 1 week unless also stamped w/keyword "Keep", in which case retain forever in the DMS Retain all versions of all Excel files in the New York office for 1 month, then monthly snapshots for the next 11 months, then purge all older versions The above examples are merely representative, and other types of policies may be implemented, e.g., such as a policy that enables DMS to cause primary storage to move, copy or delete files, e.g., to migrate aging data to cheaper storage, or to delete it from primary storage altogether.

More complex policy rules may be defined whereby one or more conditions trigger changes in the values for another set of attributes (e.g., for all documents containing the string "Flame," set the attribute "Confidentiality" to "High"). As can be seen, preferably a given policy is asserted by means of policy attributes. Attributes are grouped and managed by means of Policy Profiles, which can be thought of as documents containing groups of attributes that may be applied to certain classes of objects. The administrator asserts policy by associating Policy Profiles with data objects at any level in the hierarchy.

A model for evaluating policy attributes is summarized as follows and illustrated in FIG. 17.

Current Profile. Profiles can be assigned to DMS data objects at the level of data sources and above—i.e. data sources, repositories, regions and the root of the Repositories tree. If the object does not have a profile directly assigned to it, the profile assigned to the closest parent up the Repositories tree is taken as the current profile.

Per-attribute Override. Attributes in the current profile can be overridden by setting the attribute's value on the object itself.

Per-attribute Lock. Overriding by profile specification or attribute setting farther down the tree may be defeated by means of a per-profile, per-attribute Lock. When an attribute in a profile is locked, its value is enforced on all objects within the scope of the container with the profile; that is, its value may not be overridden either by a profile assignment or by a per-attribute override setting further down the tree.

Per-profile Block Inheritance. Inheritance from parents further up the tree may be defeated by setting the per-profile attribute Blocks inherited locks to True.

Retention Policy

The management interface enables the administrator to control how long data is retained in the DMS, preferably based on one of three policy attributes:

Continuous History. How long continuous changes are retained.

Long Term History. How long consolidated versions are retained.

Long Term Interval. Frequency of consolidated versions.

The relationship between these attributes is shown in the diagram of FIG. 18. To interpret the diagram, visualize that the versions flow steadily from right to left as time goes by. As versions flow from a first continuous period into a second long term period, they are consolidated at the specified intervals; as the consolidated versions flow out of the long term period, preferably they are purged from the DMS. Note that if the most-recent version of the data set flows out of the long term period, preferably the entire data set is purged.

Figure 19:
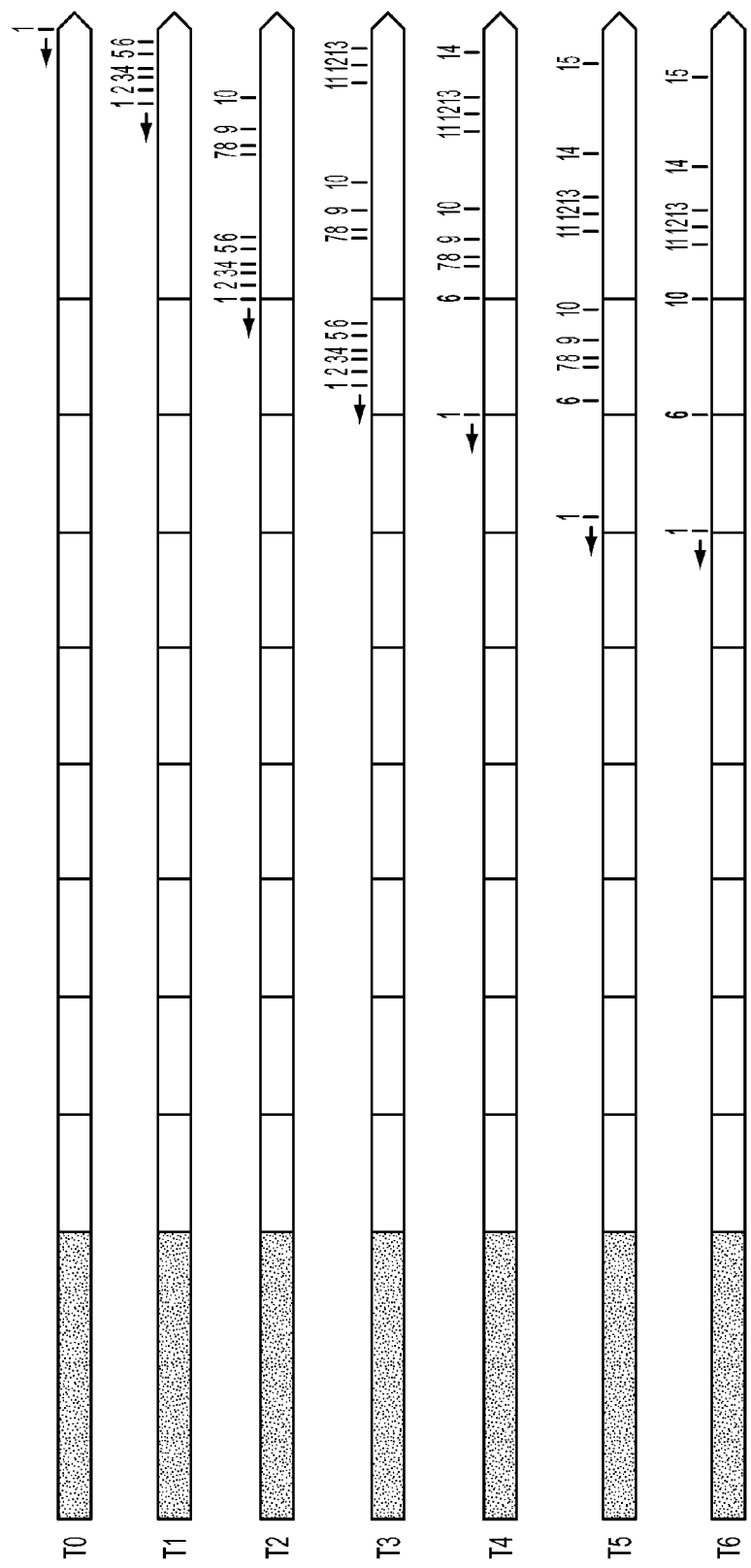
FIG. 19 illustrates a specific retention policy example.

FIG. 19 illustrates a more specific example of an illustrative retention/pruning model for a given set of versions (e.g., V1-V15) over a given set of times T0-T6. The number of versions and times are merely illustrative:

T0. Version 1 (V1) is created when the data source is initially protected. A Continuous/Longterm Boundary (separating the two color segments in the diagram) is determined based on the value of Continuous History.

T1. V2-V6 have been generated.

T2. Time (V.1 timestamp+Continuous History). V7-V10 have been generated. V1 becomes the first consolidated version.

T3. V11-V13 have been generated.

T4. Time (V.1 timestamp+2*Continuous History). V14 has been generated. V6 becomes the second consolidated version.

T5. V15 has been generated.

T6. Time (V1 timestamp+3*Continuous History). V10 becomes the third consolidated version.

Figure 20:
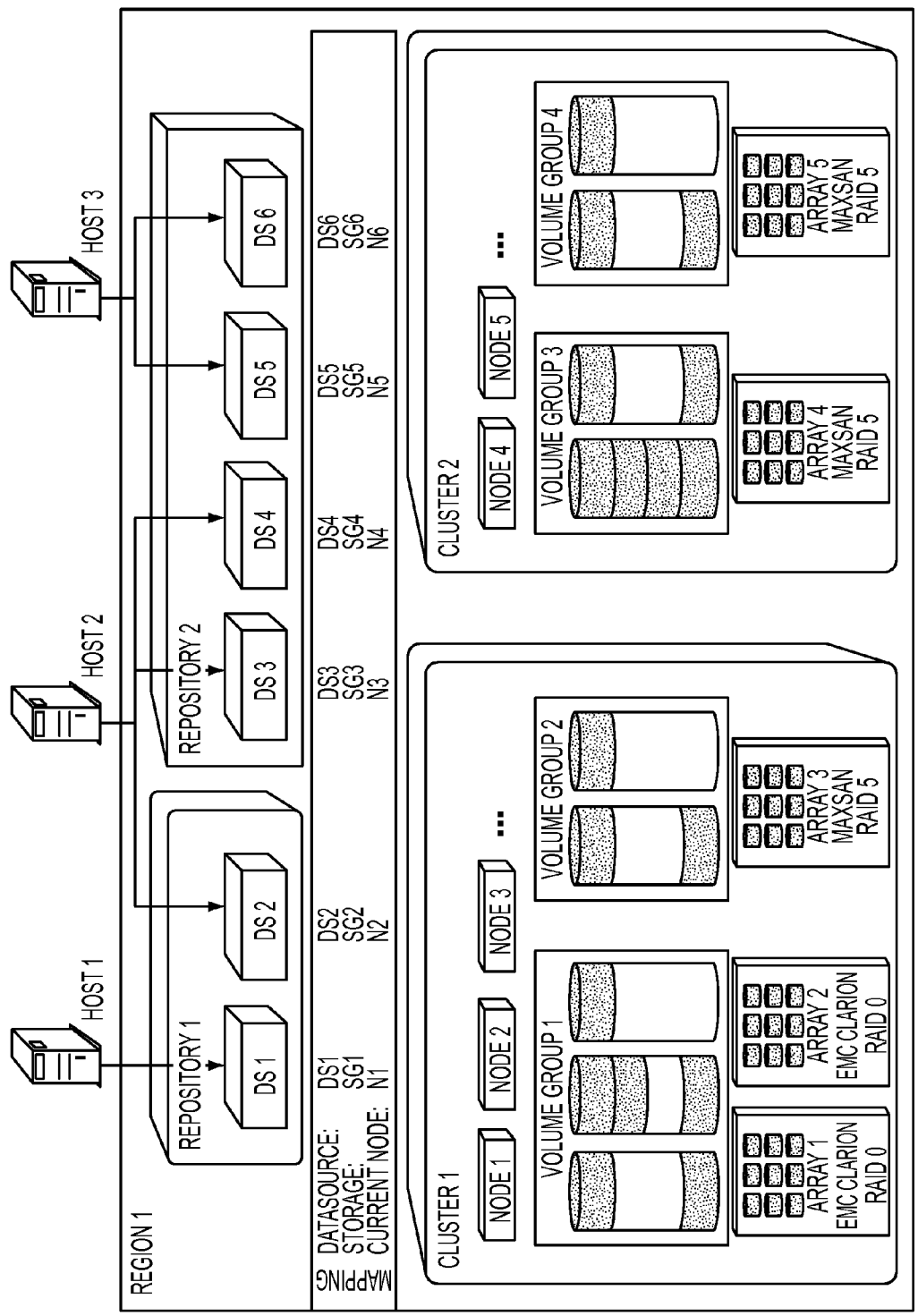
FIG. 20 illustrates how the enterprise primary storage and DMS can be modeled as a pair of logical and physical system models according to the present invention to facilitate policy management.

FIG. 20 illustrates how the enterprise primary storage and DMS can be modeled (by the management interface display) as a pair of logical and physical system models to facilitate policy management. These models are displayable on the GUI. The system can be viewed from two perspectives: a logical level of data and policy, and a physical level of compute nodes and storage. The upper portion of FIG. 20 illustrates the logical model, whereas the physical model forms the bottom portion. In particular, the logical user model allows the administrator to manage data and policy. To this end, a primary container object is the Repository, which contains data objects called Data Sets. As has been described above, Policy can be asserted at the level of Universe, Region, Repository or Data Set. This model is presented in the management interface by selecting a Data Tab. The physical user model allows the administrator to manage the physical components that run the DMS software. A primary container object is the Cluster, which contains two types of objects: computational units called Nodes, and storage units, including logical Volumes and Volume Groups, as well as the physical Disk Arrays themselves. This model is presented in the management interface by selecting a Network Tab.

In an illustrated embodiment, the management interface console is implemented as a gateway, a standalone machine, or some combination thereof. Generalizing, any of the described functions are implemented by a processor and associated program code. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described our invention, what we now claim is as follows:

1. A data management system, comprising:
   a management gateway comprising a processor and memory, the management gateway communicably coupled to a host driver and a set of nodes;
   wherein the host driver is associated with each of a set of data sources, the host driver monitoring and capturing application events and generating a continuous application-aware, data stream;
   wherein the set of nodes share a distributed data storage, the nodes receiving and storing, as data objects, the continuous application-aware data streams generated by the host drivers, wherein the stored data objects comprise a distributed data object store;
   wherein the management gateway provides a display interface comprising a time control that enables specification of a past time and display of a representation of the distributed data object store, or a given portion thereof, as it existed at the past time; and
   wherein the display interface updates the representation of the distributed data object store in real-time as data streams generated by the host drivers are received.

2. The data management system as described in claim 1 wherein the time control is one of: a linear timeline, a radial time dial, a calendar, and a search specification dialog.

3. The data management system as described in claim 1 wherein the display of the representation of the distributed data object store comprises a structure of a distributed data object store hierarchy and contents of one or more data objects at given locations in the distributed data object store hierarchy.

4. The data management system as described in claim 1 wherein the time control includes a zoom function to enable the past time to be specified at a first, coarse granularity or to a second, fine granularity.

5. The data management system as described in claim 1 wherein the display interface includes a display object, wherein selection of the display object causes the representation of the distributed data object store to switch to a current point in time.

6. The data management system as described in claim 5 further including the steps: in response to selection of a given display object, displaying a set of one or more user-traversable versions of the given display object.

7. The data management system as described in claim 1 wherein the display interface includes a policy control that enables specification of a policy.

8. The data management system as described in claim 7 wherein the policy is a retention policy.

9. The data management system as described in claim 1 wherein the representation of the distributed data object store also includes contents of data objects in the distributed data object store.

* * * * *